K. F. LEES.
TIRE TEST GAGE AND VALVE.
APPLICATION FILED OCT. 17, 1919.
1,368,512. Patented Feb. 15, 1921.
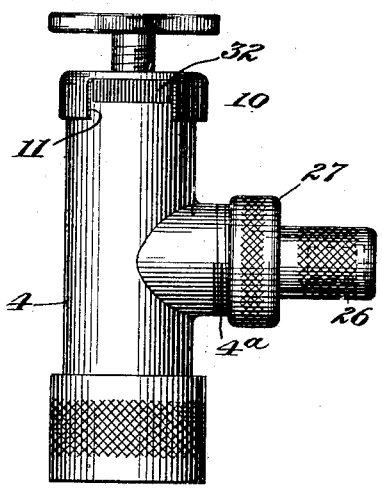
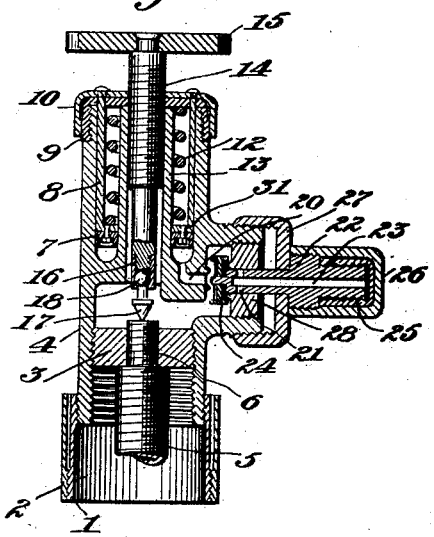
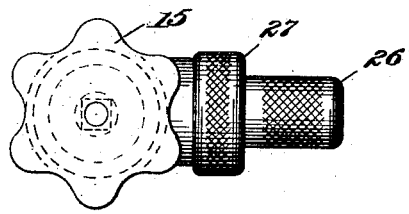
Inventor:
Kenneth F. Lees,
by C. J. Mason Att'y.

UNITED STATES PATENT OFFICE.

KENNETH F. LEES, OF NEW HAVEN, CONNECTICUT.

TIRE TEST-GAGE AND VALVE.

1,368,512.   Specification of Letters Patent.   Patented Feb. 15, 1921.

Application filed October 17, 1919.   Serial No. 331,373.

*To all whom it may concern:*

Be it known that I, KENNETH F. LEES, a citizen of the United States, residing at New Haven, in the county of New Haven and State of Connecticut, have invented certain new and useful Tire Test-Gages and Valves, of which the following is a full, clear, and exact description.

This invention relates to gages for testing the pressure in pneumatic tires, and is of that type which is permanently attached to the valve stem or tube of the tire so as to always be in position to indicate the air pressure.

Preferably, the invention relates to gages of that type which only operate when the pressure within the tire is in excess of the minimum tire safety pressure, as shown, described and claimed in my application for patent Serial No. 273,615, filed January 28, 1919 now Patent 1,328,572 patented Jan. 20, 1920.

An important object of the present invention is to provide a tire gage of the type referred to which is especially adapted for use on large tires, as for example, those used on trucks where the air pressure is higher than that in the tires used on automobiles, or other vehicles of lighter weight. The air pressure in the tires used on trucks is so great that it has been found advisable to provide a valve which is positively operated, in lieu of the ordinary spring actuated check valve for retaining the air pressure in the tire.

In accordance with the present invention, a positively operated air valve is employed which is preferably connected with its stem by flexible means, permitting the valve to "float," and be self-seating. This insures an accurate closing of the valve and has been found to be very satisfactory and reliable in action.

The invention comprises, in connection with provisions for permitting the inflation of the tire through a connection with the air gage, means for closing communication between the piston, or equivalent air actuated member of such gage, and the interior of the tire while the latter is being inflated. Such means is so capable of operation that when the inflation operation has been completed, it may be positioned to reëstablish communication between the tire gage piston and the interior of the tire, whereby the tire pressure may be ascertained, when desired, by opening the positively operated tire valve, which is accomplished by a simple manipulation.

The above, and other important features of the invention, including combinations of parts and details of construction, will be hereinafter more fully described and claimed.

In the drawings,

Figure 1 shows, in side elevation, a tire test pressure gage embodying the present invention;

Fig. 2 is a view of the same in longitudinal vertical section, showing the tire valve in elevation; and Fig. 3 is a plan view.

1 is an inner adjustable sleeve which surrounds the tire stem 5, and 2 is an outer adjustable sleeve which has threaded connection with the sleeve 1. The sleeve 1 is provided at its upper portion with an internal thread which engages the casing 4 of the tire test gage, and said casing is provided at its lower portion with an internal thread which is engaged by a plug 3, provided with a central bore which has threaded engagement with the upper reduced end portion 6 of the tire valve tube or stem 5.

The upper portion of the casing 4 is bored interiorly to form a cylinder, and is provided, at its central portion with a tubular, concentric guide 13. The space between the walls of the guide 13 and the cylindrical bore of the casing 4 is occupied by a plunger 7, having, as shown, a cup packing ring, the same being secured by rivets, as shown in Fig. 2, to the inwardly turned flange 31, the latter having rigid therewith upwardly extending guides 8. A cap 9 is interiorly threaded to engage exterior threads upon the upper portion of the casing 4, and the guides 8 extend through apertures in said cap, and also through similar apertures in a sliding cap 10, which fits over the cap 9, and is movable thereover when the plunger 7 rises and falls in response to the varying pressures within the tire. The cap 10 is preferably provided with cut-out portions 11, as shown in Fig. 1, and the fixed cap 9 may have a band of red 32, which is located a suitable distance above the lower edge of the cap 10 when the latter is in it its lowest position, as seen in Fig. 1.

The guide 13 is surrounded by a spring 12 which is confined between the cap 9 and the inturned flange 31, and a passage 20 establishes communication between the lower side of the plunger, and the interior of the casing 4 which is in communication with the tire valve.

A valve 17, which is preferably of conical form, as shown, is provided with a stem whose upper portion has a ball 18, fitting a socket within the cap 16, which is threaded to the lower end of a valve stem 14, the latter having threaded engagement with the interior of the guide tube 13. The upper end of the stem 14 is equipped with a manually-operated member, such as a hand wheel 15, by the manipulation of which the valve 17 may be moved for opening communication between the interior of the gage casing and the tire, through the valve tube 5, or for closing such communication at will.

The casing 4 is provided with a lateral branch 4ª, having external threads which are engaged by internal threads formed in an operating cap 27. A tire inflating nipple 23, which is provided with a central bore, and with openings 21 for establishing communication between the interior of the casing 4 and said bore, is secured to the cap 27. The nipple 23 is reduced in diameter at its outer end portion and is provided with an external screw thread, which is engaged by an inner cap 25, and the nipple is also provided with a relatively enlarged portion having an external thread to engage an internal thread upon an outer cap 26, the latter acting as a dust cap.

The inner end portion of the inflating nipple 23 is secured to a valve disk 24, having upon its outer face a packing which seats against an annular seat formed upon the interior portion of a bushing 28, said bushing being threaded externally to engage an internal thread in the extension 4ª, and being provided at its central portion with an aperture which receives and guides the inner reduced stem portion of the inflating nipple 23.

A device of the construction above described is adapted for attachment permanently to the valve tube 5 of each tire of the vehicle, and under normal conditions the valve stem 14 would be screwed inwardly to seat the floating valve 17 in an air tight manner upon a seat formed to receive it in the upper end portion of the tire valve stem 5. When the parts occupy these positions the pressure gage plunger 7 occupies the position shown in Fig. 2, being its lowest position in the cylinder, in which it is subject to the influence of the spring 12 and no pressure is admitted to its under surface. When it is desired to test the pressure of the tire, the handle 15 will be rotated in a direction to lift the valve 17 from its seat, thus admitting the air within the tire to escape through the valve and to exert its pressure upon the lower surface of the plunger. The strength of the spring is such that if the pressure within the tire is below that which is calculated as the minimum safety pressure for that particular tire, such pressure will be insufficient to overcome the spring, and the cap 10 will not be moved; if, on the other hand, the pressure is above the minimum safety pressure, the plunger will be raised and the cap 10 moved outwardly, the lower edge of said cap acting as an index to indicate the pressure. If such lower edge moves beyond the lower margin of the red band 32, it will indicate that the tire is over-inflated and some of the air may then be permitted to escape until the proper pressure has been reached.

Failure of the cap 10 to move when the valve 17 is open, shows under-inflation of the tire, and when this condition has become known the tire may be inflated by removing the caps 26 and 25, and attaching to the nipple 23 a connection from an air pump, or other suitable source of air pressure. Before air is admitted to the tire it is necessary, of course, to elevate the valve 17, and also to move inwardly the cap 27 which unseats the valve disk 24 from the bushing 28, and also projects the tubular portion of the nipple 23 a sufficient distance within the chamber of the casing 4 to uncover the openings 21, thus permitting the air to pass within the tire, and at the same time the valve disk 24 closes communication between the passage 20 and the interior of the casing 4, thus preventing the air under pressure from having access to the plunger of the gage. The latter result is desirable during the inflation of the tire, as otherwise the gage might be injuriously affected by the high pressures sometimes employed during the operation of inflating the tires. If it is desired to test the pressure at any time during the process of inflation, the valve 21 is, through its operating cap 27, turned completely to the left, which results in sealing the inflation nipple, and in opening communication between the passageway 27 and the interior of the tire. If when this test is made it is found that the air pressure is that desired, as shown by the position of the cap 10 on the casing 4, it is simply necessary to screw down on the central nipple valve stem 14, which seals the tire positively. This construction entirely eliminates the necessity of a spring tire valve in the inflation nipple, and is positive and more reliable, and is especially of value in connection with tires used on trucks, or where excessive pressures are employed.

While I have shown and described herein as the preferred embodiment of my invention a tire test gage of the type which is only operable under pressures above those calculated as minimum safety pressures, and have also illustrated a specific form of valve seating within the tire valve stem, it is to be understood that certain features of the invention are not necessarily concerned with such preferred form of gage and valve, but may be used with other forms of gage or valve, and hence the claims are not limited to these features unless the same are specifically mentioned therein.

Having described the invention what is claimed is:

1. A tire pressure gage having, in combination, a casing constructed to be coupled to the tire valve stem, an air pressure indicating device including a spring-resisted plunger in said casing, a positively controlled valve arranged to seat upon the open outer end of said stem for establishing communication between the tire valve stem and said plunger, an inflating connection, and a valve for closing communication between said plunger and the tire during inflation, and for opening communication between said plunger and tire when the inflation connection is cut off.

2. In a tire air pressure gage, a casing to be attached to a tire, a pressure indicating device therein, means for controlling communication between the interior of the tire and said device, a nipple movable in and relatively to said casing and adapted for connection with inflating means, a valve connected with said nipple and arranged when in one position to establish communication between said device and the tire and to close the inflating nipple, and when in another position to cut off communication between said device and the tire and to open communication between said nipple and the tire.

3. In a tire pressure gage, a casing to be attached to a tire, an air pressure indicating device therein, means for controlling communication between the interior of the tire and said device, a passage from said device to the interior of said casing, a reciprocating inflating nipple provided with a longitudinal bore and lateral openings, a valve carried by said nipple, and means for moving said nipple to cause said valve to close said passage and to establish communication between said nipple openings and the tire during inflation, and to open said passage and close such communication when inflation of the tire is completed.

4. In a tire pressure gage, a casing to be attached to a tire, a device therein to indicate tire air pressures, a positively-operated floating needle valve to control communication between said device and the tire, a tire inflating nipple, and means operated by movement of said nipple for closing communication between said device and the tire when said tire is being inflated.

5. In a tire pressure gage, a casing to be attached to a tire, a device therein to indicate tire air pressure, a positively operated floating needle valve for controlling communication between said device and the tire, a passage between said device and the interior of said casing, a tire inflating nipple having a longitudinal bore and an opening, a valve carried by said nipple, a cap threaded to the casing and attached to said nipple and operable to move the nipple for causing said valve to close said passage and to expose the nipple opening to the interior of the casing during tire inflation, and to open said passage and close the nipple opening when inflation is completed.

6. In a tire pressure gage, a casing to be attached to a tire, tire air pressure indicating means therein including a plunger, a threaded stem located interiorly of said plunger and carrying a self-adjusting needle valve to seat in the tire valve casing, a tire inflating nipple movable in said casing and having means to control communication between said plunger and the tire, and between the tire and the source of air pressure, and manual means for operating said nipple.

7. In a tire pressure gage, means to indicate tire air pressure including a plunger, a central screw stem carrying a floating needle valve to seat on the tire valve casing, a reciprocating inflating nipple carrying a valve to control communication between said plunger and the tire, and between said nipple and the tire, and means for operating said nipple.

8. In a tire pressure gage, means to denote tire air pressures, a positively operated valve arranged to seat upon the open outer end of the tire valve stem to control communication between said means and the interior of the tire, a movable inflating nipple, and means carried by said nipple to shut off communication between the pressure indicating device and the tire when the inflation connection is open, and to open such communication when the inflation connection is closed.

In testimony whereof I have hereunto set my hand this 15th day of October A. D. 1919.

KENNETH F. LEES.

Witnesses:
AGNES KENNEALLY,
HENRY O. KNOLL.